(No Model.)

J. HAMPTON.
PULLEY.

No. 457,644. Patented Aug. 11, 1891.

Witnesses
Geo. E. Freeh.
Roland A. Fitzgerald.

Inventor
James Hampton
per Lehmann & Pattison
Attys.

THE NORRIS PETERS CO., PHOTO-LITHO., WASHINGTON, D. C.

UNITED STATES PATENT OFFICE.

JAMES HAMPTON, OF CHICAGO, ILLINOIS, ASSIGNOR OF ONE-HALF TO JOHN MOTZER, OF SAME PLACE.

PULLEY.

SPECIFICATION forming part of Letters Patent No. 457,644, dated August 11, 1891.

Application filed February 21, 1890. Serial No. 341,371. (No model.)

*To all whom it may concern:*

Be it known that I, JAMES HAMPTON, of the city of Chicago, Cook county, Illinois, have invented and produced a new and original Design or Appliance for Pulleys of all Kinds and Sizes, of which the following is a specification, reference being had to the accompanying drawings, forming a part thereof.

My invention relates to an improvement in belt-pulleys; and it consists in the construction and arrangement of parts which will be fully described hereinafter.

The object of my invention is to produce a pulley having a stationary and a movable spring-actuated flange, between which the belt passes and which engages the edges thereof for the purpose of preventing it from slipping.

Figure 1:
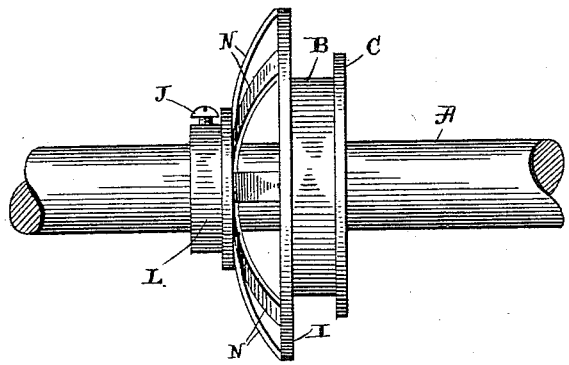
Figure 2:
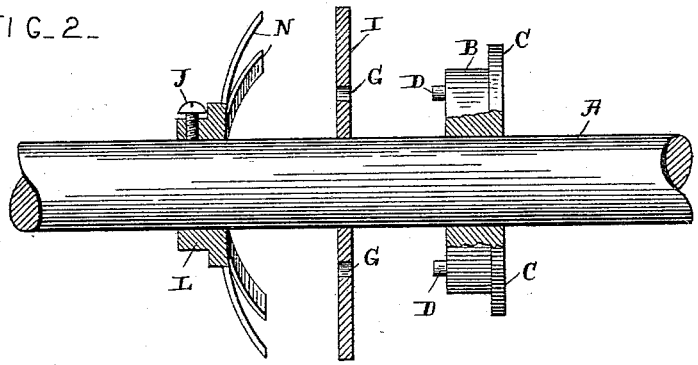
Figure 3:
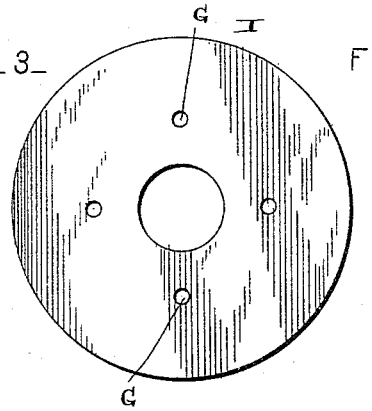
Figure 4:
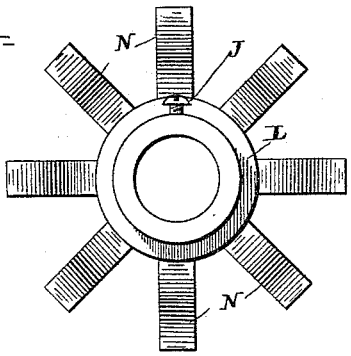

Figure 1 is a side elevation of my pulley complete. Fig. 2 is a vertical section of the same, the parts being shown separated. Fig. 3 is a detached view of the collar having radial springs. Fig. 4 is a detached view of the movable flange.

A represents a shaft to which a wheel B is firmly secured and which is provided with an annular flange C upon one side only. Extending from the inner side or face of this wheel is one or more pins D, which catch in a corresponding opening or openings G in a wheel I, which is loose upon the shaft A. This wheel abuts against the opposite side of the wheel B from the flange C and forms a flange upon that side of the pulley between which and the flange C the belt passes. Adjustably secured to the shaft by means of a set-screw is a collar L, which is provided with a number of radial springs N, the ends of which bear against the outside of the adjustable flange or wheel I and normally holds it yieldingly in contact with the inner face of the wheel B.

The belt should be wider than the periphery of the wheel B, so that when it is placed between the stationary flange C and the movable wheel or flange I a frictional contact is caused upon its edges by means of the springs N of the adjustable collar L. By adjusting the collar L upon the shaft in relation to the flange or wheel I the amount of friction upon the edges of the belt between the flanges is regulated and the belt thereby prevented from slipping. This construction admits of an adjustment, so that the belt will be allowed to slip when a certain amount of tension is brought upon the belt and damage prevented to the machine, while at the same time a positive power is given up to the adjusted tension.

Having thus described my invention, I claim—

1. In a pulley, the combination of a rigid wheel having a flange upon one side, a movable flange at the opposite side, and a spring for holding the movable flange normally in contact with the belt on the rigid wheel, substantially as shown.

2. In a pulley, the combination of a rigid wheel having a flange upon one side, projections upon its opposite side, a movable wheel or flange having openings in which the projections enter, and a spring for holding the movable flange in contact with the belt on the rigid wheel, substantially as described.

3. In a pulley, the combination of a rigid wheel having a flange upon one side, a movable flange at the opposite side thereof, an adjustable collar, and a spring engaging the collar and the movable flange, substantially as described.

4. In a pulley, the combination of a rigid wheel having a flange upon one side, a movable flange at its opposite side, and a collar having radial springs which engage the movable flange, substantially as shown.

JAMES HAMPTON.

Witnesses:
JULIUS ZITTEL,
EDWARD J. HERLOLDT.